(12) United States Patent
de Silva

(10) Patent No.: US 6,732,047 B1
(45) Date of Patent: May 4, 2004

(54) DISPLAY METHOD AND APPARATUS FOR NAVIGATION SYSTEM

(75) Inventor: Andrew S. de Silva, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 10/066,981

(22) Filed: Feb. 4, 2002

(51) Int. Cl.$^7$ .......................... G01C 21/00; G06G 7/78; G06F 17/00
(52) U.S. Cl. ........................ 701/209; 701/208; 340/988
(58) Field of Search ................................ 701/208, 209, 701/201, 211, 202, 212, 207; 340/988, 990, 995; 73/178 R

(56) References Cited

U.S. PATENT DOCUMENTS

| | | | | |
|---|---|---|---|---|
| 5,680,312 A | * | 10/1997 | Oshizawa et al. | 364/444.2 |
| 5,784,059 A | * | 7/1998 | Morimoto et al. | 345/353 |
| 5,961,572 A | * | 10/1999 | Craport et al. | 701/207 |
| 6,061,003 A | * | 5/2000 | Harada | 340/995 |
| 6,081,609 A | * | 6/2000 | Narioka | 382/113 |
| 6,088,649 A | * | 7/2000 | Kadaba et al. | 701/201 |
| 6,115,669 A | * | 9/2000 | Watanabe et al. | 701/209 |
| 6,121,900 A | | 9/2000 | Takishita | 340/995 |
| 6,240,361 B1 | | 5/2001 | Ise et al. | 701/208 |

\* cited by examiner

Primary Examiner—Tan Q. Nguyen
Assistant Examiner—Dalena Tran
(74) Attorney, Agent, or Firm—Muramatsu & Associates

(57) ABSTRACT

A display method and apparatus for navigation system for specifying the destination easily and quickly. The navigation system is designed to enable a user to quickly select a street name and easily specify the street number of the destination. The navigation system includes a menu for changing a street number of the displayed address through numeric keys. After selecting the street name on the map screen by pointing a cursor on a street image, the street number on the cursor point can be easily and quickly changed to match the destination because it is not necessary to input the street name through the key board.

18 Claims, 10 Drawing Sheets

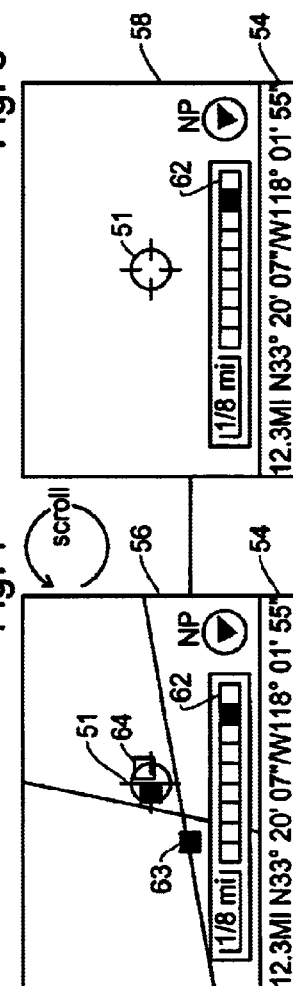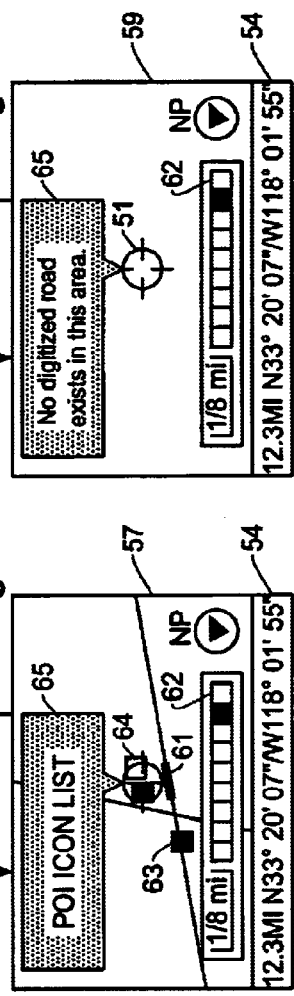

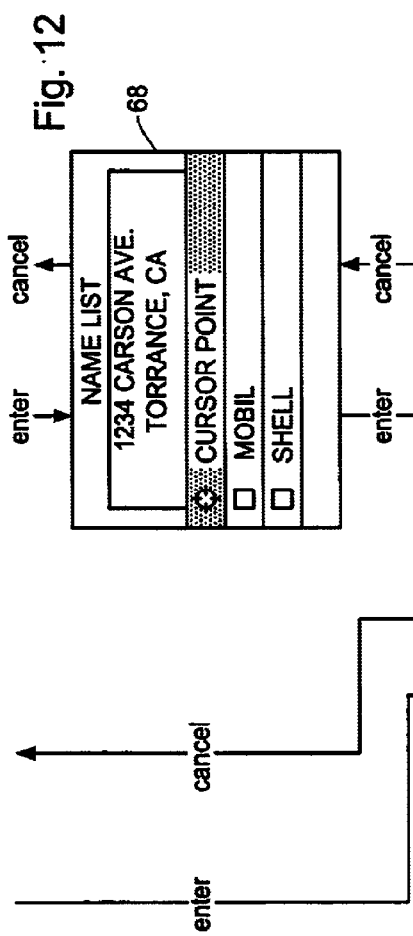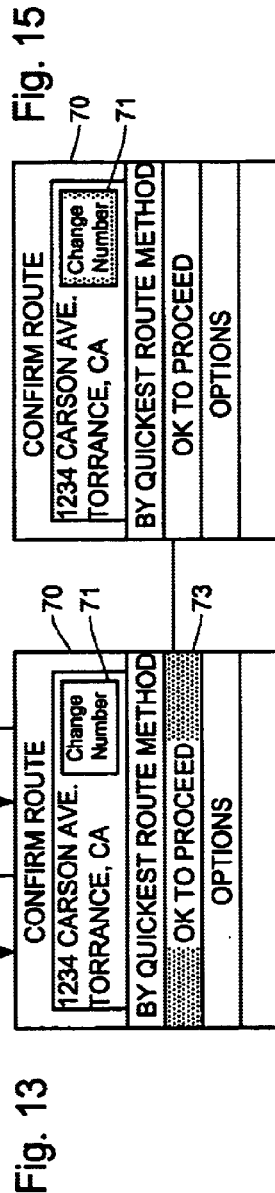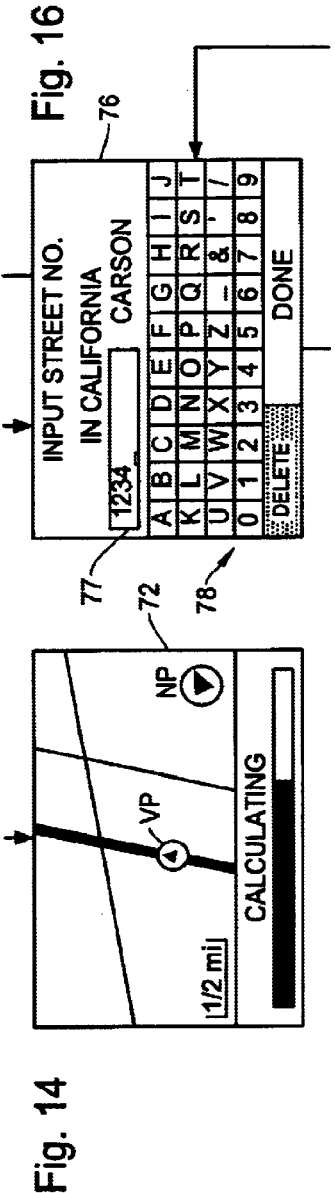

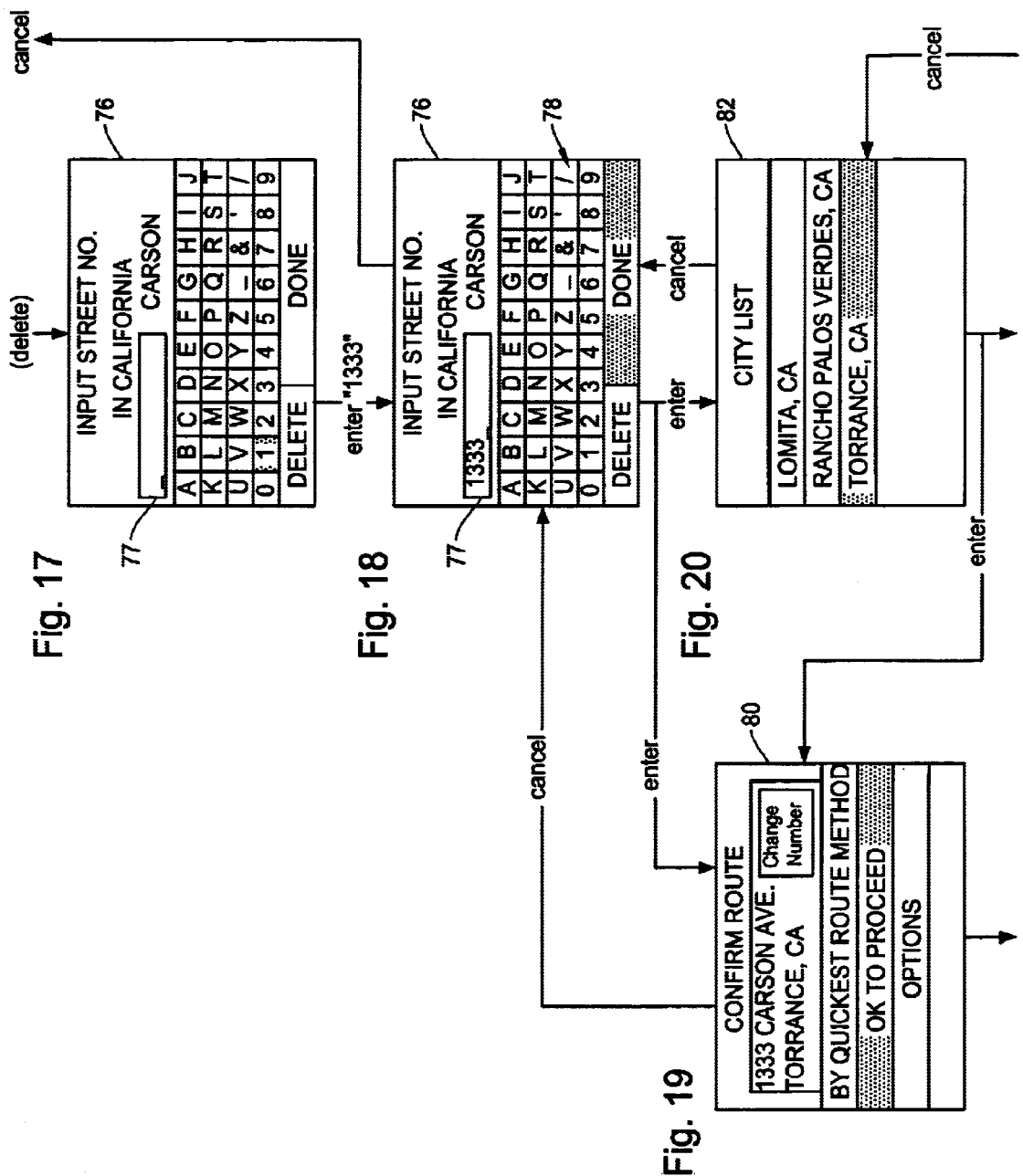

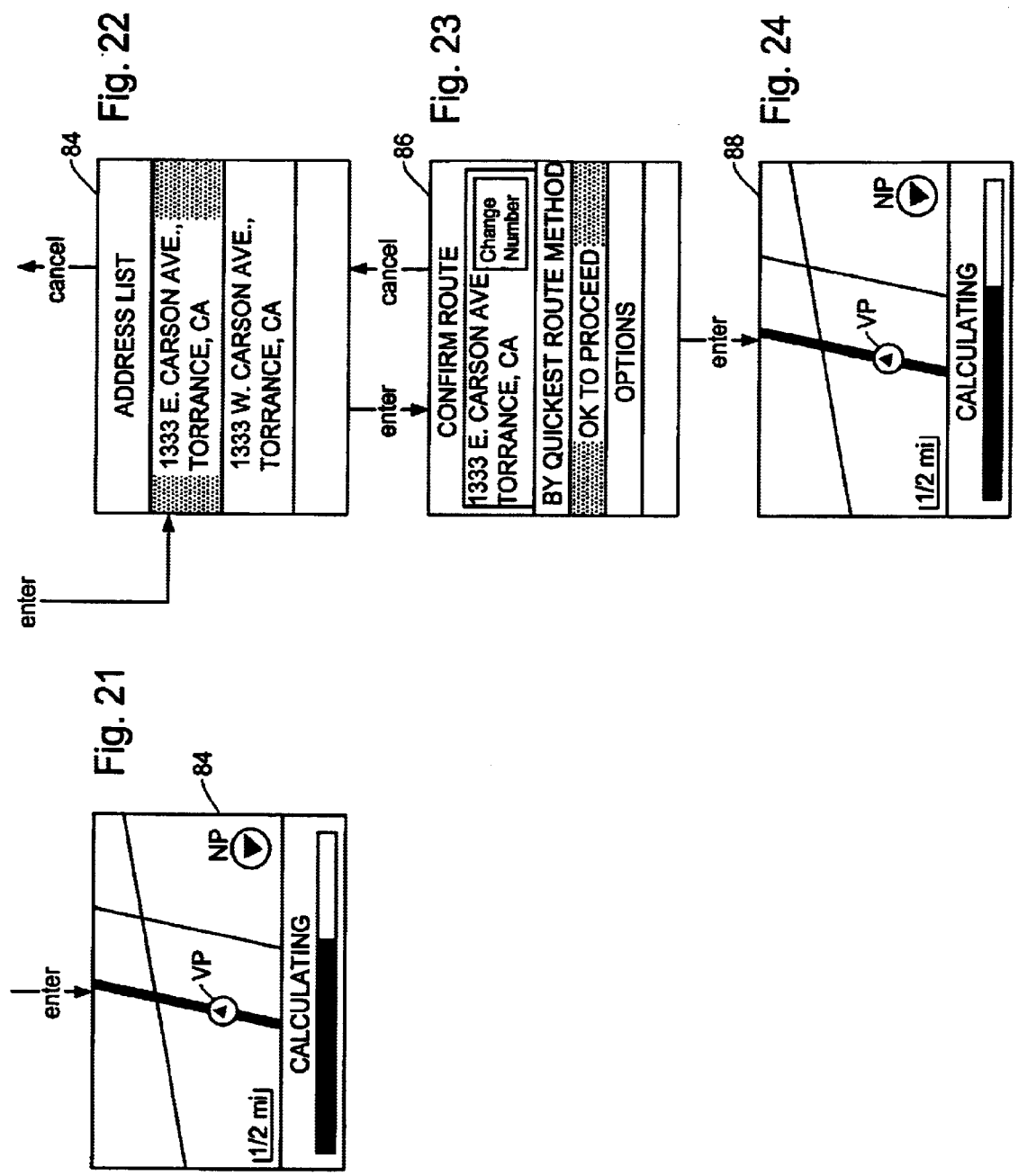

DISPLAY METHOD AND APPARATUS FOR NAVIGATION SYSTEM

FIELD OF THE INVENTION

This invention relates to a display method and apparatus for navigation system, and more particularly, to a display method and apparatus which is capable of easily selecting a street name and quickly changing a street number for specifying an address of destination in a vehicle navigation system.

BACKGROUND OF THE INVENTION

A vehicle navigation system performs vehicle travel guidance for enabling a driver to easily drive the vehicle to a selected destination. Such a navigation system detects the position of the vehicle, reads out map data pertaining to an area at the vehicle current position from a data storage medium, for example, a CD-ROM (compact disk read-only memory) or a DVD (digital versatile disc), and displays a map image on a monitor screen (display) while superposing a mark representing the current location of the vehicle on a predetermined portion of the map image.

The vehicle position is determined by self-contained navigation sensors (e.g. a distance traveled sensor and a bearing sensor) mounted in the vehicle or by a global positioning system (GPS) including an artificial satellite (satellite navigation). The satellite enables absolute position detection and higher position accuracy than the self-contained navigation sensors. However, the satellite navigation involves a problem of position detection failure such as in a tunnel or a building where the satellite radio signals are obstructed. Therefore, recent navigation systems utilize both self-contained navigation and satellite navigation to achieve improved performances.

As the present position of the vehicle changes with the travel of the vehicle, the vehicle current position mark in the map image on the screen is changed accordingly. Alternatively, the map is scrolled while the vehicle current position mark is fixed at a predetermined position, for example, at the center of the image. In either method, the navigation system enables the driver to recognize the map information of the area at the vehicle position at a glance.

When a destination is not set, such a navigation system functions as a locator map which indicates the current location of the vehicle on a map image. When the destination is set, the navigation system starts a route guidance function for setting a guided route from the starting point to the destination. Typically, the route guidance function performs an intersection guidance process in which a monitor screen displays an enlarged intersection diagram and the direction in which the vehicle is to travel while displaying the guide route on a map. When a destination is input, a CPU in the navigation system determines a most suitable guided route from the current vehicle position to the destination and successively stores nodes (expressed in longitude and latitude) constituting the guided route in a memory.

During actual traveling, the node series stored in the memory is searched for a portion of the guided route to be displayed in a map display area of the monitor screen, and the portion of the guided route is highlighted so as to be discriminable from other routes. When the vehicle is within a predetermined distance of an intersection it is approaching, an intersection guidance diagram (an enlarged or highlighted intersection diagram with an arrow indicating the direction in which the vehicle is to turn at the intersection) is displayed to inform a driver of the desired one of roads or directions selectable at the intersection.

FIG. 1A shows an example of a locator map display containing a vehicle current position mark VCP on a map image 21. Typically, a navigation system shows the street on which the vehicle is running in the map image 21 and a name of the street such as "W 190TH ST" in an information box 23 on the monitor screen. Other information such as a north pointer NP, a map scale and a current time may also be illustrated on the display screen. In this manner, the locator map display shows the current position of the vehicle on the map image, however, it does not perform the route guidance function because the destination is not set in the navigation system.

FIG. 1B shows an example of route guidance display which performs the route guidance function. The route guidance display is activated after specifying the destination. In addition to the map image 21 similar to the locator map of FIG. 1A, this example further shows an arrow indicating the direction (left) in which the vehicle is to turn at the intersection in a guidance information box 22 at the top of the screen. The guidance information box 22 also shows a name of the street "PRAIRIE AVE" which intersects with the current street "W 190TH ST" and a distance to the intersection. Thus, the navigation system indicates that the vehicle should make a left turn at the intersection with "PRAIRIE AVE".

Typically, the current street "W 190TH ST" and the left side of the street "PRAIRIE AVE" will be highlighted in the map image 21. Further, such route guidance is accompanied by voice instructions. If the direction of travel in the next intersection is left, the navigation system gives spoken guidance such as "turn left at the next intersection". In this example, an information box 24 at the bottom of the display screen includes information regarding the remaining distance to the final destination and an estimated time to reach the final destination.

In order to be guided by the route guidance mode such as shown in FIG. 1B, a destination must be specified in the navigation system so that the system can find one or more routes to get to the destination. FIGS. 2A–2F show examples of display shown on the monitor screen during the operation of inputting the destination.

By operating a menu key, a main menu 25 such as shown in FIG. 2A is displayed on the navigation system and a menu item "Destination" is selected from the main menu. This allows the navigation system to display a "Enter Destination by" menu 27 as shown in FIG. 2B for specifying an input method for selecting the destination. The "Enter Destination by" menu 27 lists various methods for selecting the destination including "Address" for specifying the city and address of the destination, "Intersection" for specifying the names of two streets in the city which intersect with one another, and "Point of Interest" for selecting the programmed destination based on the name, category or telephone number.

Other methods in the "Enter Destination by" menu 27 include "Recent Route" for specifying the destination based on the recent destinations saved in the navigation system, "Address Book" for selecting the address of the destination out of the addresses stored in the system, and "Map Cursor" for specifying the destination by pointing a cursor to the destination on the map. For example, the information in the address book is formed of a list of names and addresses of the places that the driver frequently visits.

When selecting, for example, the "Point of Interest" in FIG. 2B, the navigation system displays a "Category List"

menu 28 such as shown in FIG. 2C. The "Category List" menu 28 contains various different categories such as "Bank", "Restaurant", "Hotel", "Shopping" and others. If the category "Shopping" is selected, the navigation system displays "Name List" such as shown in FIGS. 2D and 2E. The "Name List" shows names of shops and shopping malls sorted by, for example, distance from the vehicle. In an address information box 31 on the display, the address and phone number of the highlighted name in the list 33 will be displayed. The address information box 31 may also show the distance to the highlighted shop. Typically, the navigation system stores several tens or hundreds of names of shops within predetermined distances and displays several shops per page of display screen, and a user may scroll the display screen to see other names of shops in the name list 36 such as shown in FIG. 2E.

When the destination is not prestored in the navigation system, a user can input the destination by selecting, for example, the "Address" method or "Intersection" method in the "Enter Destination by" menu 27 of FIG. 2B. Then, the navigation system displays an "Enter Street Name" shown in FIG. 2F for inputting the city and address in an address input box 37 by means of a key board (keypad) 38 displayed on the monitor screen.

After inputting the destination, the navigation system determines a route to the destination based on, for example, the shortest way to reach the destination, the route using many free ways as possible or the route without using toll road, and the like. Thus, the navigation system moves to the route guidance display such as shown in FIG. 1B which performs the route guidance.

In the process of specifying the destination, there is a case where a user knows a particular address of his destination although he does not know how to reach that destination. Suppose the particular address is not in the "Address Book" or "Recent Route" method noted above, the user has to specify the address of the destination through the key board such as shown in FIG. 2F. This input method takes time and adversely affects the safe driving.

Therefore, in such a case, rather than hitting the key board one by one, for specifying the street (house) number and the street name, the user wants a quicker way to specify the destination address. For example, in many navigation systems currently in the market, a user can specify the street on the map image by pointing the cursor (marker) on the particular street. Then, the navigation system displays a confirmation screen which shows the street number and the street name of the cursor point. This process is quicker to input the street name than that using the key board.

In such a situation, suppose the address of his destination is "1333 Carson Ave. Torrance, Calif.", and the displayed address of the cursor point is "1234 Carson Ave. Torrance, Calif.", he wants to change the number "1234" to "1333" on the screen. However, the navigation systems today do not provide a convenient way to easily and quickly change the number on the navigation display. Thus, the user has to repeat the process of adjusting the cursor point on the street to pin-point the street number to "1333". This process is inconvenient and burdensome and distracts driver's attention to the driving.

In many cases, a driver knows a particular address and is familiar with the city of such a particular address, and thus, he can easily find the street on the map screen. As noted above, however, in the conventional technology, it is not possible to easily change the street number to the particular address. Therefore, there is a need for a navigation system which can easily and quickly change the street number to specify the destination.

SUMMARY OF THE INVENTION

It is, therefore, an object of the present invention to provide a navigation system which enables a user to easily and quickly operate the navigation system for specifying a destination by selecting a street name through a map image and changing a street number to specify the destination.

The navigation system is designed to enable a user to quickly select a street name and easily specify the street number of the destination. The navigation system includes a menu for changing a street number of the displayed address through numeric keys or other means. After selecting the street name on the map screen, the street number on the cursor point can be easily and quickly changed to match the destination because it is not necessary to input the street name through the key board.

More specifically, the method of the present invention includes steps of: displaying a map image and locating a street image on the map image which is considered as going to user's destination, specifying a point on the street image by a cursor (cursor point) on the map image, displaying an address of the cursor point for confirming the address where the address includes at least a street name and a street number, selecting a change number menu, changing the street number of the cursor point address to a street number depicting the user's destination, and calculating route to the user's destination from a current position and guiding the user to reach the destination.

In the step of changing the street number, the method further includes a step of displaying a key board screen for changing the street number wherein the key board screen maintains the street name and other information on the address at the cursor point and allows to change only the street number.

Preferably, the method further includes a step of selecting a city name after changing the street number in a case where an address including the changed street number belongs to a city different from a city in the cursor point address. Further, the method includes a step of selecting an address of the user's destination after changing the street number when two or more same addresses including the street number that has been changed and the street name exist within a specified city.

Another aspect of the present invention is a display apparatus for a vehicle navigation system. The display apparatus is configured by various means for achieving the display methods described above which utilizes the "Change Number" menu for changing the street number of the cursor point address specified,on the map screen.

According to the present invention, the vehicle navigation system enables the user to enter the destination easily and quickly. First, the user selects the particular street on the map screen, then changes the street number on the key board screen through the "Change Number" process. Since this process does not require to input the street name by the key board, but only needs to change the street number, the user can easily and quickly specify the destination in the navigation system.

BRIEF DESCRIPTION OF THE DRAWINGS

FIG. 2A is a main menu, FIG. 2B is a destination set menu, FIG. 2C shows a list of category when setting a point of interest, FIGS. 2D and 2E show name lists in the category specified in FIG. 2C, and FIG. 2F shows a key board display for entering the street name of address or intersection.

FIG. 5 is a diagram showing a display example when the navigation system is in a locator map screen where destination is not specified.

FIG. 6 is a diagram showing a display example when the display image on the navigation system is scrolled in the map screen of FIG. 5.

FIG. 7 is a diagram showing a display example when the navigation system shows POI icons when the display image is scrolled on the screen of FIG. 6.

FIG. 8 is a diagram showing a display example of the navigation system when the display image is further scrolled on the screen of FIG. 7 where there is no digitized road.

FIG. 9 is a diagram showing a display example including a balloon message when a cursor point specifies a particular street when the display image is scrolled on the screen of FIG. 6.

FIG. 10 is a diagram showing a display example including a balloon message when the cursor point specifies a POI icon when the display image is scrolled on the screen of FIG. 7.

FIG. 11 is a diagram showing a display example including a balloon message when the cursor point does not specify any street or POI icon on the screen of FIG. 8.

FIG. 12 is a diagram showing a display example which has a list of addresses involving the POI icons and street specified by cursor on the screen of FIG. 10.

FIG. 13 is a diagram showing a display example when the address displayed in the balloon message on the screen of FIG. 9 or the address in the name list on the screen of FIG. 12 is selected.

FIG. 14 is a diagram showing a display example when the destination is confirmed on the confirmation screen of FIG. 13 and the navigation system calculates the optimum route to the destination.

FIG. 15 is a diagram showing a display example when a "change number" menu is selected on the route confirmation screen of FIG. 13.

FIG. 16 is a diagram showing a display example of key board when the "change number" menu is executed on the route confirmation screen of FIG. 15.

FIG. 17 is a diagram showing a display example in the "change number" process when the delete key on the screen of FIG. 16 is selected to cancel the old street number and input a new street number.

FIG. 18 is a diagram showing a display example in the "change number" process for inputting the new street number through the key board.

FIG. 19 is a diagram showing a display example when the new street number is specified on the screen of FIG. 18 to confirm the new address.

FIG. 20 is a diagram showing a display example in the "change number" process to select a city name when the street name with the newly specified street number exists in two or more cities.

FIG. 21 is a diagram showing a display example when the destination is confirmed on the confirmation screen of FIG. 19 and the navigation system calculates the optimum route to the destination.

FIG. 22 is a diagram showing a display example in the "change number" process to select a street name and number in a case where two or more same street names and numbers exist in the same city.

FIG. 23 is a diagram showing a display example for confirming the new address specified on the screen of FIG. 22 as the destination.

FIG. 24 is a diagram showing a display example when the destination is confirmed on the confirmation screen of FIG. 23 and the navigation system calculates the optimum route to the destination.

DETAILED DESCRIPTION OF THE INVENTION

Figure 25:
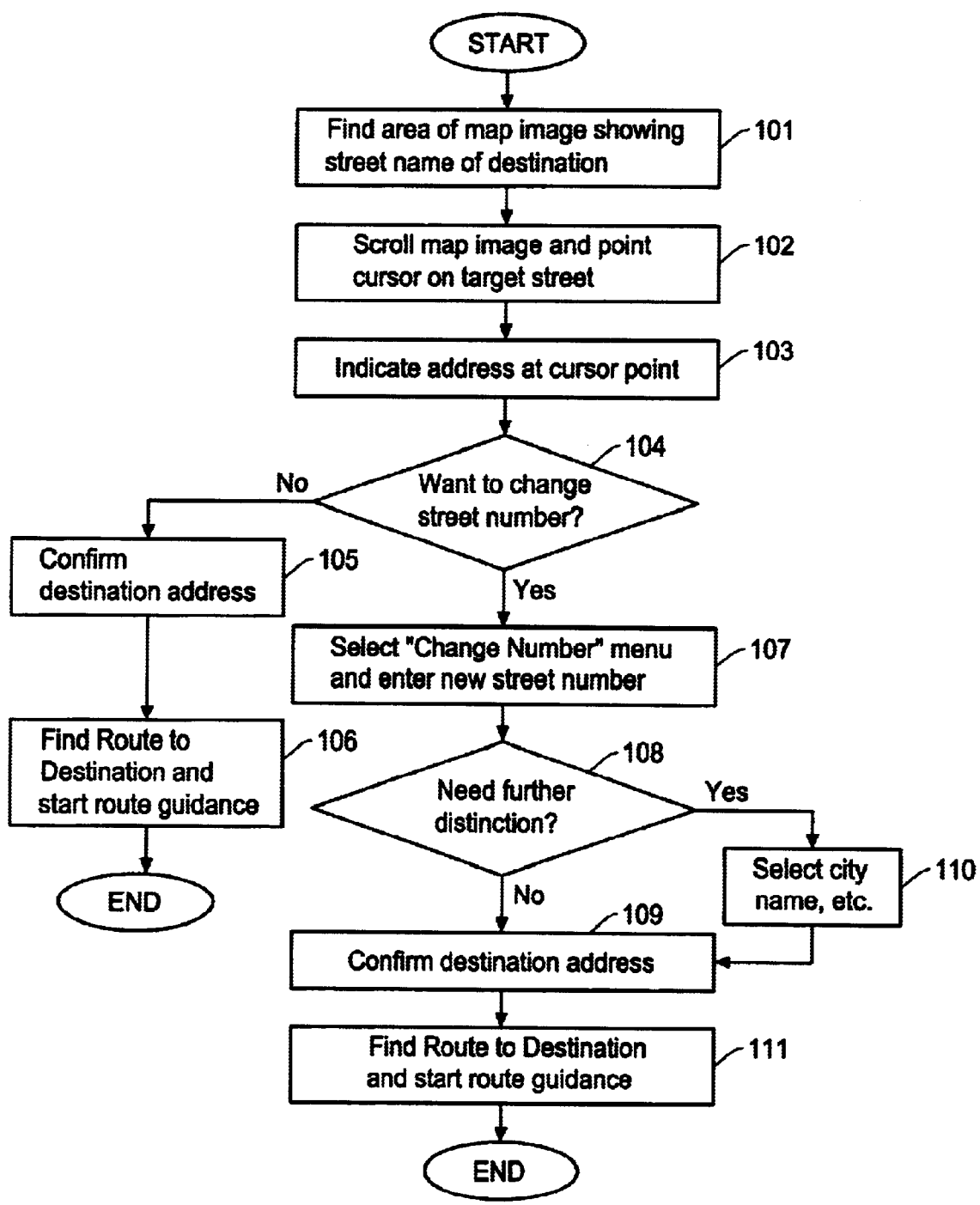
FIG. 25 is a flow chart showing an example of operational process in the navigation system of the present invention shown in FIGS. 5–24.

The navigation system of the present invention is designed to enable a user to quickly specify the destination when the user knows a particular address of the destination. In accordance with the present invention, a user such as a driver can quickly enter the street name and change the street (house) number to his destination. Examples of operation process and display screen in the present invention are shown in FIGS. 5–24 in which the destination is specified starting from a map screen of the navigation system. FIG. 25 shows a flow chart illustrating the operation process in the navigation system of the present invention.

Figure 3:
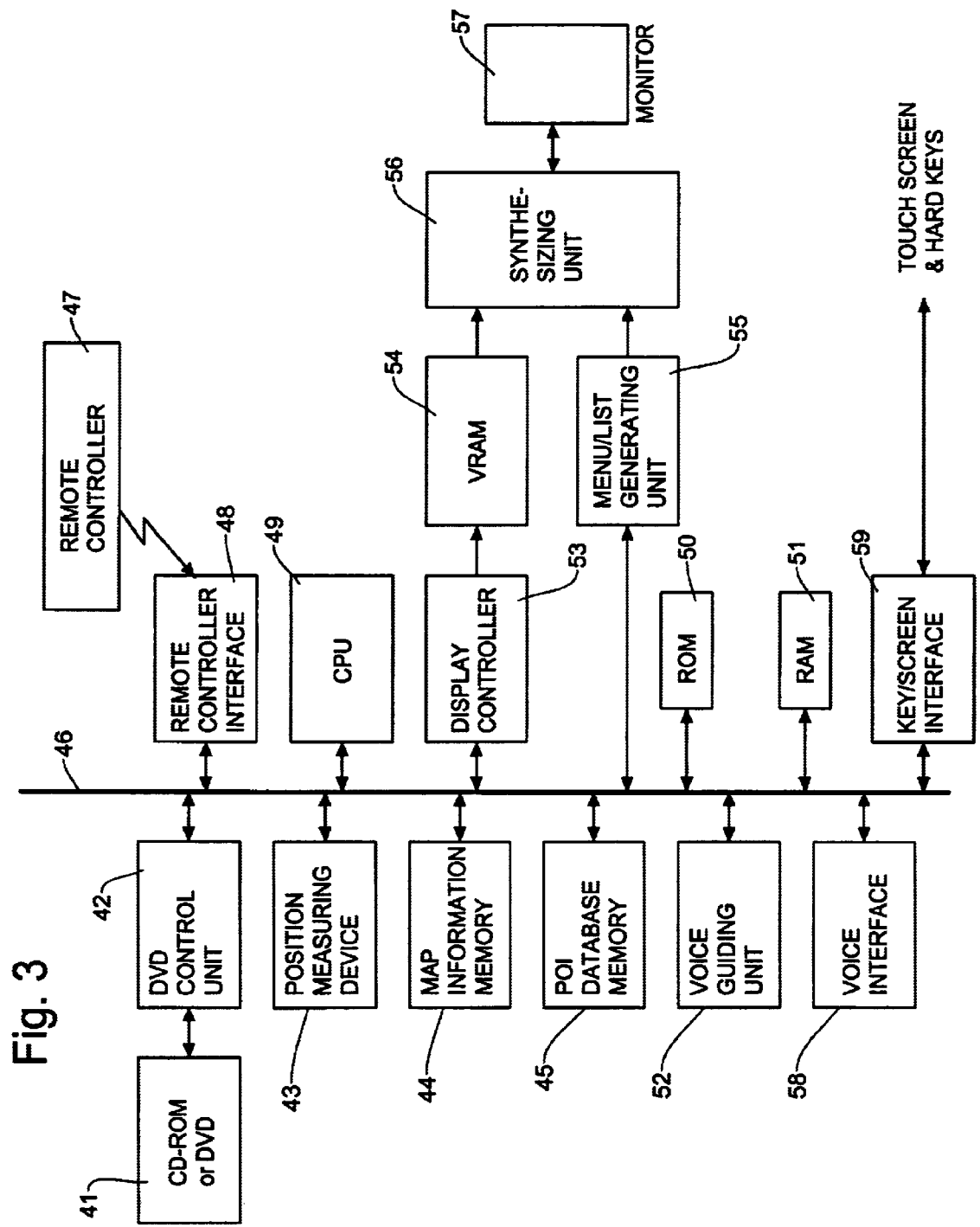
FIG. 3 is a block diagram showing an example of structure in the vehicle navigation system according to the present invention.
Figure 4A:
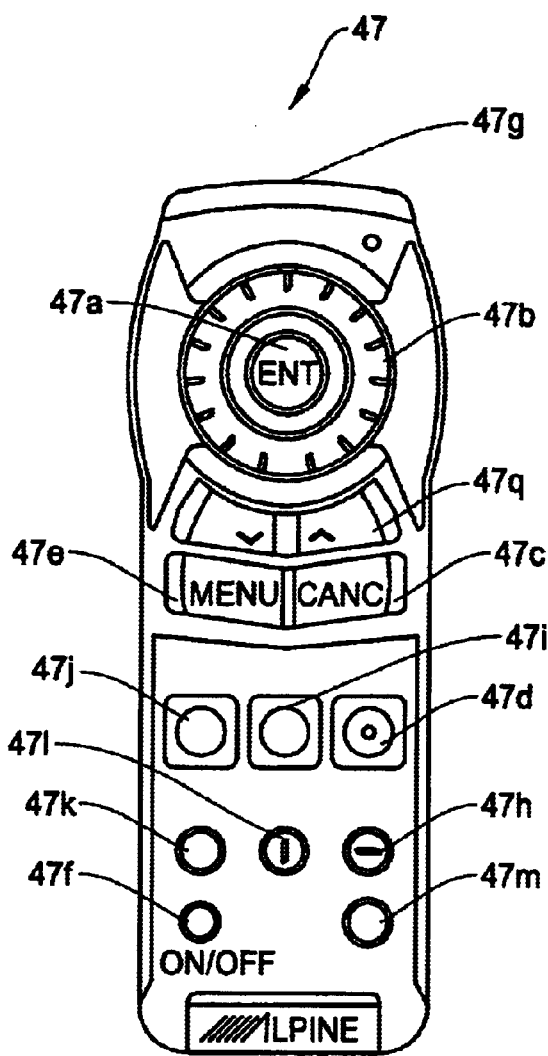
FIGS. 4A and 4B are diagrams showing an example of a remote controller accompanied by the vehicle navigation system of the present invention.
Figure 4B:
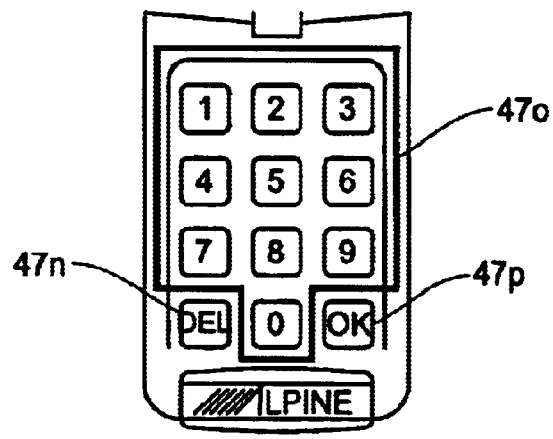

Before going into details of the display examples of FIGS. 5–24, a brief description is made regarding the basic structure of the navigation system with reference to FIG. 3 and an example of remote controller for the navigation system with reference to FIGS. 4A and 4B.

In the block diagram of FIG. 3, the navigation system includes a map storage medium 41 such as a CD-ROM, DVD, hard disc or other storage means (hereafter "DVD") for storing map information, a DVD control unit 42 for controlling an operation for reading the map information from the DVD, a position measuring device 43 for measuring the present vehicle position. The position measuring device has a vehicle speed sensor for detecting a moving distance, a gyro for detecting a moving direction, a microprocessor for calculating a position, a GPS receiver, and etc.

The block diagram of FIG. 3 further includes a map information memory 44 for storing the map information which is read out from the DVD 41, a database memory 45 for storing database information such as point of interest (POI) information which is read out from the DVD 41, a remote controller 47 for executing a menu selection operation, an enlarge/reduce operation, a destination input operation, etc. and a remote controller interface 48.

The remote controller 47 has a variety of function keys as shown in FIG. 4A and numeric keys as shown in FIG. 4B. The numeric keys appear when a lid in the lower part of FIG. 4A is opened. The remote controller 47 includes a joystick/enter key 47a, a rotary encoder 47b, a cancel key 47c, an MP/RG key 47d, a menu key 47e, a zoom/scroll key 47g, a monitor ON/OFF key 47f, a remote control transmitter 47g, a plan key 47h, an N/H key 47i, a voice key 47j, a list key 47*k*, a detour key 47*i*, a delete destination key 47*m*, a delete key 47*n*, numeric keys 47*o*, and an OK key 47*p*.

The joystick/enter key 47*a* selects highlighted items within the menu and moves map displays and a vehicle position icon. The rotary encoder 47*b* changes zoom scale, scrolls list pages, moves the cursor, and etc. The cancel key 47*c* cancels the present displayed screen or is operated when returning the screen to the previous menu screen. The MP/RG key 47*d* toggles between detailed map display and basic guide display during guidance. The menu key 47*e* displays the main menu. The plan key 47*h* starts the route having several destinations set by Today's Plan function, the N/H key 47*i* changes between North-up and Heading-up orientation, and the voice key 47*j* initiates voice instruction.

Although a remote controller such as described above is a typical example for selecting menus, executing selected functions and etc., the navigation system includes various other input methods to achieve the same and similar operations done through the remote controller. For example, the navigation system includes hard keys and a joystick on a head unit of the system mounted on a dash board, a touch screen, and a voice communication device.

Referring back to FIG. 3, the navigation system further includes a bus 46 for interfacing the above units in the system, a processor (CPU) 49 for controlling an overall operation of the navigation system, a ROM 50 for storing various control programs such as a route search program and a map matching program necessary for navigation control, a RAM 51 for storing a processing result such as a guide route, a voice guiding unit 52 for guiding a traveling direction at a crossroad with spoken instructions, a display controller 53 for generating map images (a map guide image and an arrow guide image) on the basis of the map information, a VRAM 54 for storing the images generated by the display controller, a menu/list generating unit 55 for generating menu image/various list images, a synthesizing unit 56 for synthesizing images from the VRAM 54 and the menu/list generating unit 55, a monitor (display) 57, a voice interface 58 for voice communication between the user and system, and a key and screen interface 59 for interfacing with various other input means such as hard keys and joystick on a panel of the system or a touch screen of the system, and the like.

With reference to FIGS. 5–25, in the present invention, the destination is specified starting from a map screen by selecting the street name rather than inputting the address through the key board. Then, the user can change the street number to the correct street number using a change number process of the present invention. FIGS. 5–24 show display examples and operational processes in the navigation system of the present invention. FIG. 25 shows a flow chart summarizing the operations of the navigation system illustrated in FIGS. 5–24.

Figure 2A:
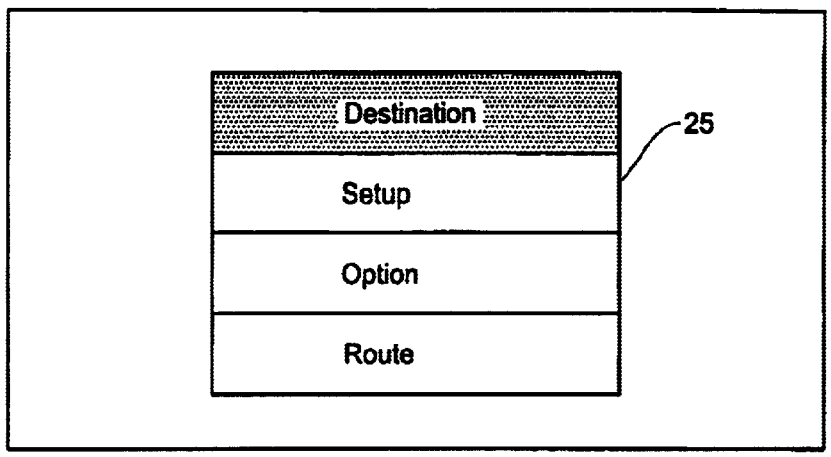
FIGS. 2A–2F are schematic diagrams showing display examples of a navigation system.
Figure 2B:
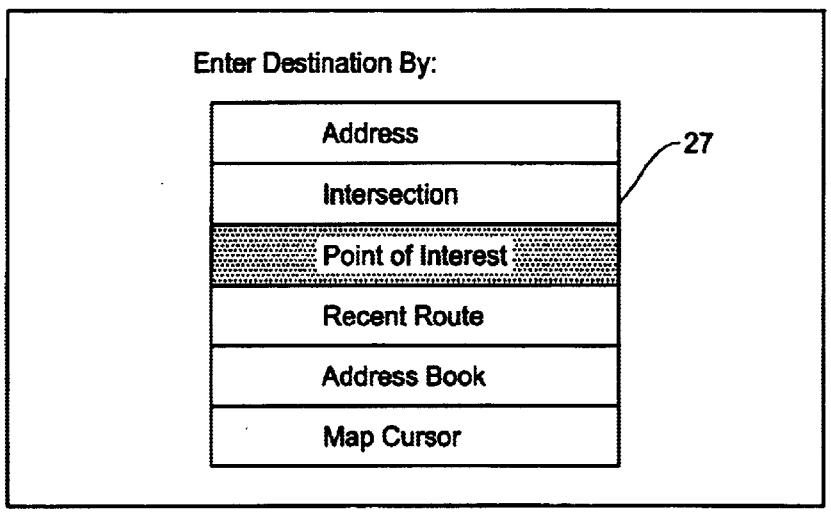
Figure 2C:
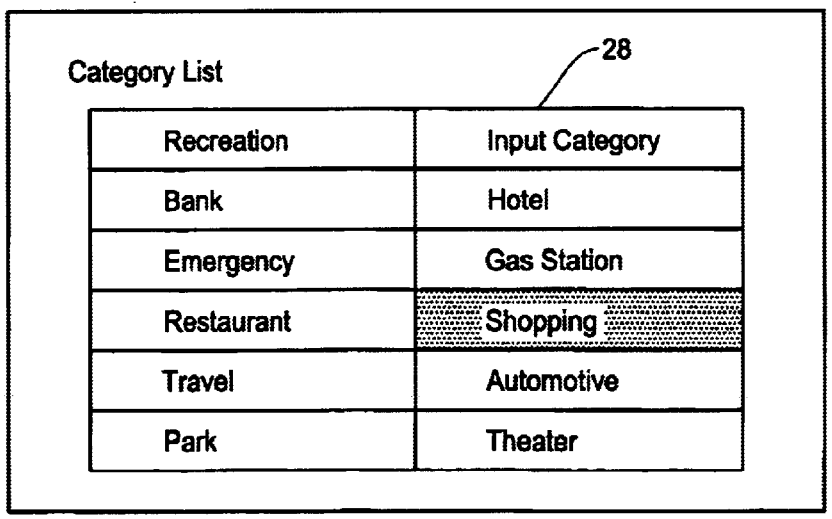
Figure 2D:
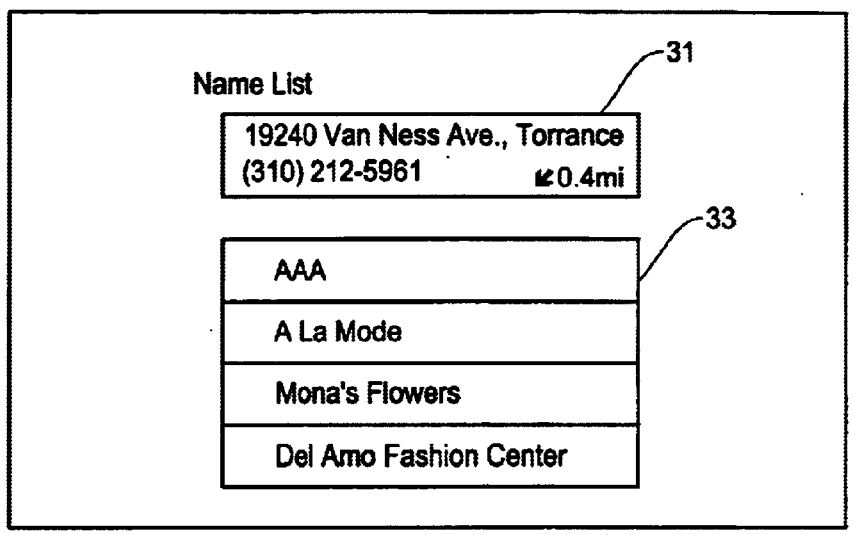
Figure 2E:
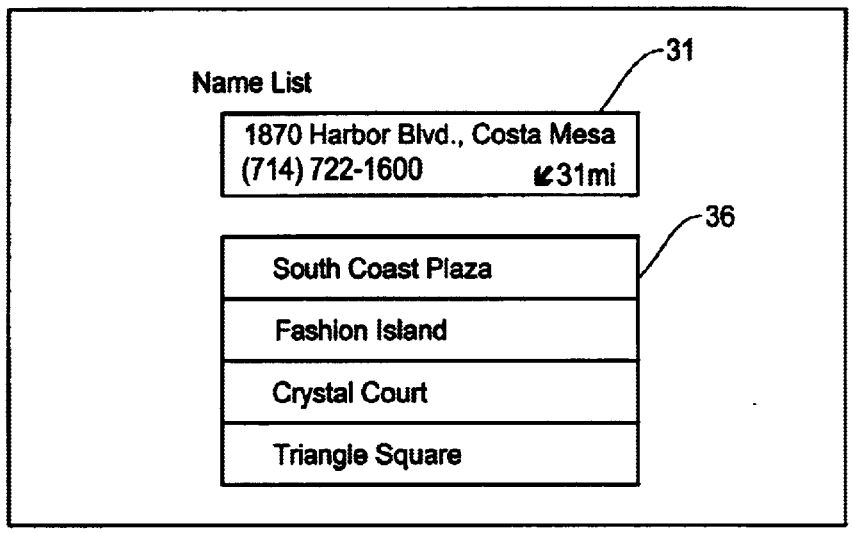
Figure 2F:
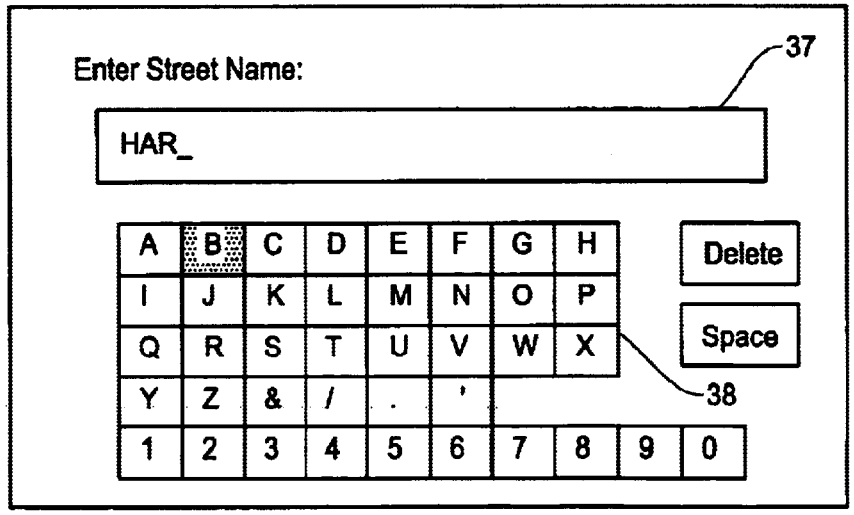

There arises a case where a user is familiar with a particular city and knows a particular address in that city where he wants to go. In such a situation, for entering the destination in the navigation system, the user goes to a map screen 50 of FIG. 5 rather than a key board screen of FIG. 2F. In the examples of FIGS. 5–24, it is assumed that the address of his destination is "1333 Carson Ave. Torrance, Calif.". On the map screen of FIG. 5, the navigation system displays the current vehicle position VP on a highlighted street on which the vehicle is running. The screen 50 also shows a north pointer NP and a map scale. The name of the highlighted street is shown in an information box 53 in the lower part of the screen.

The user sets the map image of the city "Torrance, California" with use of, for example, a zoom function of the navigation system. The user scrolls the map display on a scroll screen 52 as shown in FIG. 6. In this example, the map image is moved while a cursor (marker) 51 is fixedly displayed at a center of the screen. Alternatively, it is also possible that the cursor 51 can be moved on the screen. An information box 54 in the lower part of the screen shows the cursor position such as in latitude and longitude. When the user finds a particular street which goes to the particular destination, he adjusts the map image so that the cursor 51 specifies a selected point on the street image. During the process of adjusting the position of the street to the cursor 51, the zoom function will also be used.

Then, the user presses the enter key, which brings the navigation system to a screen which shows an address of the selected street. It should be noted that, within the context of this invention, an operation of the key, such as pressing the enter key, means any execution of the same or similar function such as by the remote controller, keys on the panel of head unit, a touch screen, or through a voice communication. Further, throughout this invention, the same or similar message displayed on the navigation screen can also be made by voice communication.

In this example, by pressing the enter key, the navigation system moves to the screen 55 on which a balloon message 65 is displayed as shown in FIG. 9. The balloon message shows an address of the street specified by the cursor point 61. As noted above, such an address message may also be made verbally. The screen 55 also shows a zoom scale 62 since the zoom function is used for pointing the cursor 51 on the street image. As shown in the screen 55, it is assumed that the initial address message is "1234 Carson Ave. Torrance, Calif.", which is the address at the cursor point 61.

Since the street name in the balloon message 65 is correct in the screen 55 of FIG. 9, the user presses the enter key, which brings the navigation system to a route confirmation screen 70 of FIG. 13. Before going into the details of the route confirmation screen 70, operations and display examples of FIGS. 7–12 will be described here. The examples shown in FIGS. 7–12 relate to the operation showing a POI (point of interest) icon.

When the display image shows a relatively small area with large enough size such as when using the zoom function, the navigation system will display POI icons. As shown in FIG. 7, the navigation system displays pre-established POI icons 63 and 64 on a screen 56. Such POI icons include a restaurant icon, gas station icon, and the like.

Typically, the navigation system is so designed that the name and address designated by the POI icon will be specified by the cursor 51. Thus, when the cursor 51 points at least one POI icon on the screen 56 of FIG. 7, and the user presses the enter key, the navigation system displays a balloon message 65 which reads "POI Icon List" in FIG. 10. This message in FIG. 10 means that a list of names associated with the POI icons and the street name at the cursor point 61 will, be displayed in the next step.

The user presses the enter key, which brings the navigation system to a name list screen 68 as shown in FIG. 12. The name list screen lists the names of the places designated by the POI icons shown in FIG. 10 in the area specified by the cursor 51. In the example of FIG. 12, by selecting the "Cursor Point" in the name list, the screen 68 displays the street address "1234 Carson Ave. Torrance, Calif." at the cursor point 61, which is the same as that shown in FIG. 9. Thus, by hitting the enter key, the navigation system moves to the route confirmation screen of FIG. 13.

FIG. 8 shows a situation where the display image of FIG. 7 is scrolled and the cursor 51 is in an area where no POI icon or street exists. Thus, the screen 58 shows only the cursor 51 at the center. If the user presses the enter key in FIG. 8, the navigation system displays a screen 59 including a balloon message 65. The message 65 reads, for example, "No Digitized Road Exists in This Area" as shown in FIG. 11. Therefore, the user has to return to the prior screens such as shown in FIG. 6 or 7 to find the particular street of his destination.

Referring back to FIG. 13, the confirmation route screen 70 shows the address at the cursor point 61 in FIG. 9 or FIG. 10. This screen is to confirm the destination before proceeding to the route calculation process. In this example, as noted above, the cursor point is on the particular street specified by the user, thus, the address reads "1234 Carson Ave. Torrance, Calif.".

Figure 1A:
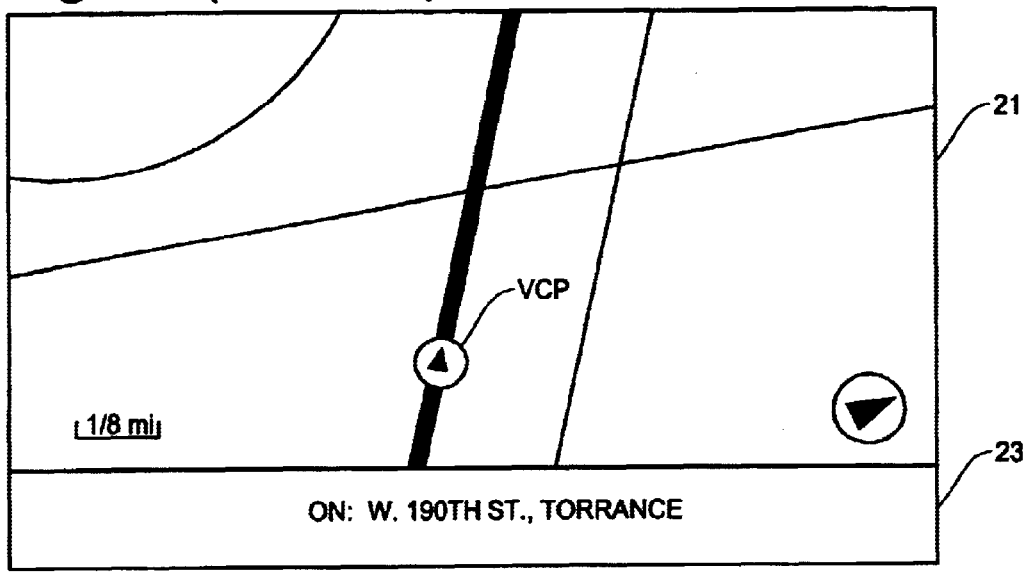
FIGS. 1A and 1B are schematic diagrams showing an example of locator map display and route guidance display, respectively, of a navigation system.
Figure 1B:
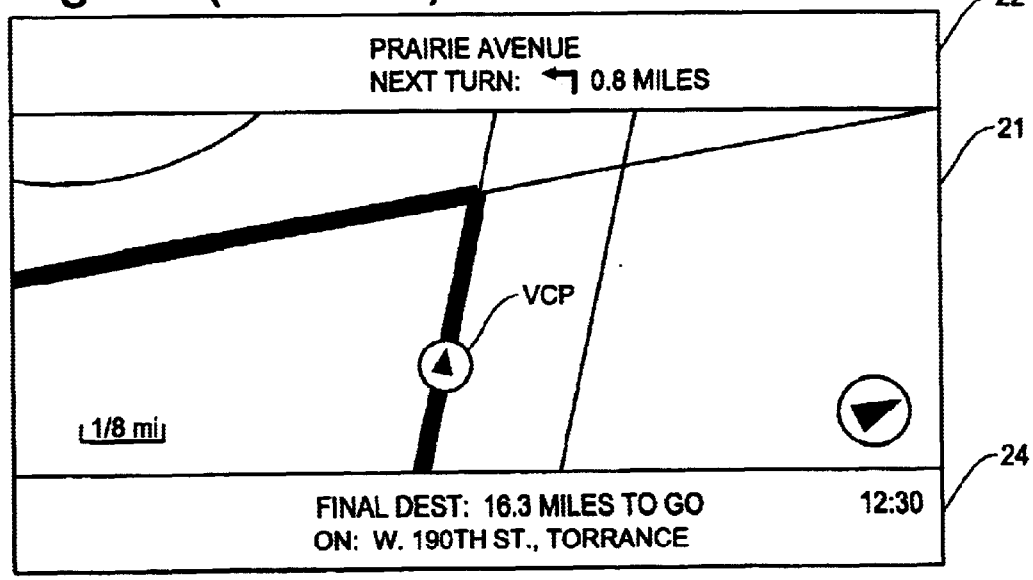

In the case where the user selects an "OK to Proceed" menu on the confirmation screen 70 of FIG. 13 and presses the enter key, the navigation system moves to the route calculation process shown in FIG. 14. In this example, the navigation system shows a progress in the route calculation process on a screen 72 by a time scale. After determining the appropriate route to the destination, the navigation system displays the route guidance screen such as shown in FIG. 1B.

In the present invention, the route confirmation screen 70 in FIG. 13 includes a "Change Number" menu 71. As noted above, the confirmation screen 70 shows the address "1234 Carson Ave. Torrance, Calif." which is different from the intended destination "1333 Carson Ave. Torrance, Calif." only in the street number. Therefore, the "Change Number" menu is provided to change the street number for the street specified through the map image in the foregoing. It should be noted that the "Change Number" menu can be called not only by the route confirmation screen as shown in FIG. 13, but various other means, such as, from other stages of display screen, through the remote controller, voice command, keys on the panel, and the like.

FIG. 15 shows a situation where the "Change Number" menu is selected by the user. Then, the user hits the enter key, which brings the navigation system to a key board screen 76 of FIG. 16 showing a key board 78. The key board screen 76 is designed to input only the street number (rather than street name) in a street number box 77. Thus, the key board screen 76 maintains the street name, city name and other information on the screen so that only the street number has to be changed. In this example, the street number box 77 shows the current street number "1234". The user selects a "Delete" menu in FIG. 16 to delete the current street number. Various other input methods can also be used to achieve the same function as deleting the existing street number, such as through voice instruction, hard keys on the panel, touch screen, and the like.

In FIG. 17, the user inputs the street number by selecting numeric keys on the key board screen 76. Since this process requires to use only numeric keys, the input by the user can be done easily and quickly. The user enters the street number "1333" and selects a "Done" menu in FIG. 18, thereby completing the number change process. The above process of entering the street number can also be done by other means such as voice instructions.

When pressing the enter key, the navigation system goes to the route confirmation screen 80 of FIG. 19. This is the same screen as that shown in FIG. 13. Since the address on the confirmation screen 80 shows the correct street name and number, the user selects the "OK to Proceed" menu and presses the enter key. The navigation system moves to the route calculation process shown in FIG. 21 which is the same as that shown in FIG. 14. The navigation system calculates and determines the appropriate route to the destination and displays the route guidance screen such as shown in FIG. 1B. In this manner, the user can quickly select the street name through the map screen and change the street number through the key board screen.

FIG. 20 shows a special situation where the navigation system displays a city list when the enter key is pressed after entering the new street number in FIG. 18. As a result of changing the street number, there may arise a situation where the particular address now exists in other city or cities as well. Thus, the city list screen 80 of FIG. 20 is used to confirm the city name. Since the street with the new street number is in the city of Torrance, the user selects "Torrance, Calif." and presses the enter key. The navigation system goes to either the route confirmation screen 80 in FIG. 19 or an address list screen 84 in FIG. 22.

The navigation system displays the address list screen 84 in FIG. 22 for a rare occasion where two or more addresses carrying the same street name and number exist in the city. For example, as shown in the example of FIG. 22, suppose the city of Torrance has addresses of "1333 E. Carson Ave." and "1333 W. Carson Ave.", the user has to specify which address is his destination. Similar to the east and west distinction in the above example, there may be a situation where streets have symmetrical addresses using north and south distinction. Thus, in FIG. 22, the user selects the "1333 E. Carson Ave., Torrance, Calif." and presses the enter key.

The navigation system displays the route confirmation screen 86 of FIG. 23 which is the same as those shown in FIGS. 13 and 19 to confirm the final destination. Since the address on the confirmation screen 86 shows the correct street name and number, the user selects the "OK to Proceed" menu and presses the enter key. The navigation system moves to the route calculation process shown in FIG. 24 which is the same as those shown in FIGS. 14 and 21. The navigation system calculates and determines the appropriate route to the destination and displays the route guidance screen such as shown in FIG. 1B. In this manner, the user can quickly specify the street name through the map screen and change the street number through the key board screen.

The operational flow of the embodiment described above is shown in the flow chart of FIG. 25. In this example, at step 101, the user goes to the map screen 50 of FIG. 5 to find the area on the map showing the particular street. As shown in FIGS. 9 and 10, by scrolling the map image, and also preferably using the zoom function, the cursor 51 points the particular street by the cursor point 61 in step 102. Then, at step 103, the navigation system indicates the address of the street at the cursor point 61 on display as shown in FIGS. 12 and 13 and/or by voice.

In step 104, the user determines whether it is necessary to change the street number shown in the address in the route confirmation screen of FIG. 13. If it is not necessary to change the street number, such as when it is sufficient to reach the area close to the final destination, the user selects the "OK to Proceed" menu at step 105. Then, at step 106, the navigation system calculates appropriate routes to the selected destination and changes the display to a route guidance screen such as shown in FIG. 1B, which ends the process of entering the destination.

If the user wants to change the street number in the step 104, he selects the "Change Number" menu shown in FIG. 13 at step 107. Then, the navigation system displays a key board screen such as shown in FIGS. 16–18 for entering the new street number. As noted above, various input means can be used for this purpose, such as through the voice communication, operation of hard keys on the panel, remote controller, touch screen, etc. After changing the street number, the navigation system moves to the route confirmation screen at step 109.

Alternatively, if necessary, the navigation system alerts the user that further distinction of the address is necessary at step 108 as shown in FIGS. 20 and 22. Such a case arises when the new street number changes the city which belongs so that the city name has to be confirmed. In another example, because of the new street number, it arises a situation where two same addresses exist in the city so that east/west or north/south distinction has to be made. The user specifies the city name or east/west distinction, or etc. in step 110.

After changing the street number in the step 108 or after making the required distinction in the step 110, the navigation system displays the destination confirmation screen at step 109. If the address on the confirmation screen is correct, the user selects the "OK to Proceed" menu as shown in FIG. 23. Then, at step 111, the navigation system calculates appropriate routes to the selected destination as shown in FIG. 24. Then, the navigation system changes the display to a route guidance screen such as shown in FIG. 1B, which ends the process of entering the destination.

As has been described above, according to the present invention, the vehicle navigation system enables the user to enter the destination easily and quickly. First, the user selects the particular street on the map screen, then changes the street number on the key board screen through the "Change Number" process. Since this process does not input the street name by the key board, but only changes the street number, the user can easily and quickly specify the destination in the navigation system.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A display method for a navigation system, comprising the following steps of:
    displaying a map image on a monitor screen and locating a street image on the map image which is considered as going to user's destination;
    specifying a point on said street image by a cursor (cursor point) on the map image;
    displaying an address of said cursor point on the monitor screen for confirming said address which includes at least a street name and a street number;
    changing said street number of said address of said cursor point on the street image to a street number depicting said user's destination; and
    calculating a route to said user's destination from a current position and guiding the user to reach said user's destination.

2. A display method for a navigation system as defined in claim 1, wherein said step of changing said street number includes a step of displaying a key board screen for changing said street number wherein said key board screen maintains said street name and other information on said address at said cursor point and allows to change only said street number.

3. A display method for a navigation system as defined in claim 1, wherein said step of displaying and locating said street image includes a step of scrolling and/or zooming said map image on the monitor screen of said navigation system.

4. A display method for a navigation system as defined in claim 1, wherein said step of specifying said cursor point on said street image includes a step of scrolling and/or zooming said map image on the monitor screen of said navigation system.

5. A display method for a navigation system as defined in claim 1, wherein said step of displaying the address at said cursor point on said street image includes a step of expressing a message on the monitor screen or by voice for explaining information associated with said cursor point.

6. A display method for a navigation system as defined in claim 1, wherein said step of displaying the address at said cursor point on said street image includes a step of displaying a POI (point of interest) icon and expressing a message in a balloon format or voice for explaining information associated with said POI icon.

7. A display method for a navigation system as defined in claim 1, wherein said step of changing said street number includes a step of deleting a current street number and adding a new street number in a street number box on a key board screen.

8. A display method for a navigation system as defined in claim 1, further comprising a step of selecting a city name after changing said street number in a case where an address incorporating a new street number resulted from changing said street number belongs to a city different from that of said address at said cursor point.

9. A display method for a navigation system as defined in claim 1, further comprising a step of selecting an address of said user, s destination after changing said street number when two or more same addresses including both said street number that has been changed and said street name exist within a specified city.

10. A display method for a navigation system as defined in claim 9, wherein said two or more same addresses are distinguished from one another by specifying information including east/west or north/south of a particular street.

11. A display apparatus for a navigation system, comprising:
    means for displaying a map image on a monitor screen of said navigation system and locating a street image on the map image which is considered as going to user's destination;
    means for specifying a point on said street image by a cursor (cursor point) on the map image;
    means for displaying an address of said cursor point on the monitor screen for confirming said address which includes at least a street name and a street number;
    means for changing said street number of said address of said cursor point on the street image to a street number depicting said user's destination; and
    means for calculating a route to said user's destination from a current position and guiding the user to reach said user's destination.

12. A display apparatus for a navigation system as defined in claim 11, wherein said means for changing said street number displays a key board screen on the monitor screen for changing said street number wherein said key board screen maintains said street name and other information on said address at said cursor point and allows to change only said street number.

13. A display apparatus for a navigation system as defined in claim 11, further comprising means for scrolling and zooming said map image on the monitor screen of said navigation system.

14. A display apparatus for a navigation system as defined in claim 11, further comprising means for expressing a message on the monitor screen or by voice for explaining information associated with said cursor point.

15. A display apparatus for a navigation system as defined in claim 11, further comprising means for displaying a POI (point of interest) icon and expressing a message in a balloon format on the monitor screen or voice for explaining information associated with said POI icon.

16. A display apparatus for a navigation system as defined in claim 11, further comprising means for selecting a city name after changing said street number in a case where an address incorporating a new street number resulted from changing said street number belongs to a city different from that of said address at said cursor point.

17. A display apparatus for a navigation system as defined in claim 11, further comprising means for selecting an address of said user's destination after changing said street number when two or more same addresses including both said street number that has been changed and said street name exist within a specified city.

18. A display apparatus of a navigation system as defined in claim 17, wherein said two or more same addresses are distinguished from one another by specifying information including east/west or north/south of a particular street.

* * * * *